United States Patent
Okada

(10) Patent No.: US 11,856,973 B2
(45) Date of Patent: Jan. 2, 2024

(54) INSTANT SOUP STOCK SOLID SEASONING AND METHOD FOR MANUFACTURING SAME

(71) Applicant: ARIAKE JAPAN Co., Ltd., Tokyo (JP)

(72) Inventor: Kineo Okada, Tokyo (JP)

(73) Assignee: Ariake Japan Co., Ltd., Tokyo (JP)

( * ) Notice: Subject to any disclaimer, the term of this patent is extended or adjusted under 35 U.S.C. 154(b) by 507 days.

(21) Appl. No.: 16/760,637

(22) PCT Filed: Oct. 25, 2018

(86) PCT No.: PCT/JP2018/039672
§ 371 (c)(1),
(2) Date: Apr. 30, 2020

(87) PCT Pub. No.: WO2019/087924
PCT Pub. Date: May 9, 2019

(65) Prior Publication Data
US 2020/0345047 A1    Nov. 5, 2020

(30) Foreign Application Priority Data
Oct. 31, 2017 (JP) .................................. 2017-210898

(51) Int. Cl.
*A23L 23/10* (2016.01)
*A23L 13/10* (2016.01)
(Continued)

(52) U.S. Cl.
CPC .................. *A23L 23/10* (2016.08); *A23L 5/34* (2016.08); *A23L 5/51* (2016.08); *A23L 5/55* (2016.08);
(Continued)

(58) Field of Classification Search
CPC . A23L 23/10; A23L 5/34; A23L 13/10; A23L 13/52; A23L 27/10; A23L 27/88;
(Continued)

(56) References Cited

U.S. PATENT DOCUMENTS 4,287,218 A * 9/1981 Rich .................. A23L 13/67
426/407
4,384,009 A * 5/1983 Lewis .................. A23B 4/03
426/465
(Continued)

FOREIGN PATENT DOCUMENTS

AU   2008201631 A1 * 5/2008 ............. A23L 23/00
JP   59-102373 A    6/1984
(Continued)

OTHER PUBLICATIONS

BioMed Research International, https://www.ncbi.nlm.nih.gov/pmc/articles/PMC4515277/table/tab1/ (Year: 2015).*
(Continued)

*Primary Examiner* — Drew E Becker
(74) *Attorney, Agent, or Firm* — Scully, Scott, Murphy & Presser, PC

(57) ABSTRACT

According to one embodiment, provided is a method for manufacturing a solid bouillon seasoning (A), said method comprising a step for preparing a mixture (E) which comprises a raw edible meat (B) and a bouillon (C) having a higher inosinic acid concentration (mass %) compared to the edible meat (B), and a step for drying the mixture (E) by the microwave vacuum drying method.

6 Claims, 1 Drawing Sheet

(51) Int. Cl.
*A23L 27/00* (2016.01)
*A23L 13/50* (2016.01)
*A23L 5/30* (2016.01)
*A23P 30/10* (2016.01)
*A23L 27/10* (2016.01)
*A23L 5/00* (2016.01)

(52) U.S. Cl.
CPC ............ *A23L 13/10* (2016.08); *A23L 13/52* (2016.08); *A23L 27/10* (2016.08); *A23L 27/88* (2016.08); *A23P 30/10* (2016.08); *A23V 2002/00* (2013.01)

(58) Field of Classification Search
CPC .......... A23L 13/30; A23L 13/428; A23L 5/51; A23L 27/26; A23L 5/55; A23P 30/10; A23V 2250/204
See application file for complete search history.

(56) References Cited

U.S. PATENT DOCUMENTS

| | | | | | |
|---|---|---|---|---|---|
| 4,664,924 | A | * | 5/1987 | Sugisawa | A23L 5/34 426/465 |
| 6,793,948 | B2 | * | 9/2004 | Okada | A23L 23/10 426/468 |
| 6,800,309 | B2 | * | 10/2004 | Okada | A23L 13/30 426/655 |
| 2001/0053405 | A1 | * | 12/2001 | Cheuk | A23K 40/25 426/641 |
| 2002/0168461 | A1 | * | 11/2002 | Melwitz | A23L 23/00 426/589 |
| 2004/0005382 | A1 | * | 1/2004 | Okada | A23L 13/30 426/55 |
| 2004/0005397 | A1 | * | 1/2004 | Okada | A23L 13/428 426/589 |
| 2005/0153018 | A1 | * | 7/2005 | Ubbink | A23P 20/11 426/61 |
| 2007/0271811 | A1 | * | 11/2007 | Tsuruta | A23B 4/015 34/264 |
| 2008/0044532 | A1 | * | 2/2008 | Mora Castillo | A23L 13/426 426/441 |
| 2008/0179318 | A1 | * | 7/2008 | Cornwell | A23L 19/03 219/686 |
| 2012/0291305 | A1 | * | 11/2012 | Fu | A23L 3/01 34/263 |
| 2015/0223504 | A1 | * | 8/2015 | Lee | A23L 27/88 426/656 |
| 2015/0257415 | A1 | * | 9/2015 | McGrane | A23K 20/121 426/656 |
| 2017/0027203 | A1 | * | 2/2017 | Washizu | A23L 17/20 |
| 2020/0022399 | A1 | * | 1/2020 | Blijdenstein | A23P 10/28 |

FOREIGN PATENT DOCUMENTS

| | | | |
|---|---|---|---|
| JP | 60-102165 | A | 6/1985 |
| JP | 2007-43952 | A | 2/2007 |
| JP | 2008-184392 | A | 8/2008 |
| JP | 2012-161268 | A | 8/2012 |
| JP | 5033934 | B1 * | 9/2012 |
| JP | 2013-189383 | A | 9/2013 |
| JP | 2014-217321 | A | 11/2014 |
| WO | WO 2004/004491 | A1 | 1/2004 |

OTHER PUBLICATIONS

International Preliminary Report on Patentability and Written Opinion dated May 14, 2020 issued in PCT/JP2018/039672.
Extended European Search Report dated Jul. 6, 2021 from related EP 18873155.8.
International Search Report dated Nov. 27, 2018 issued in PCT/JP2018/039672.

* cited by examiner

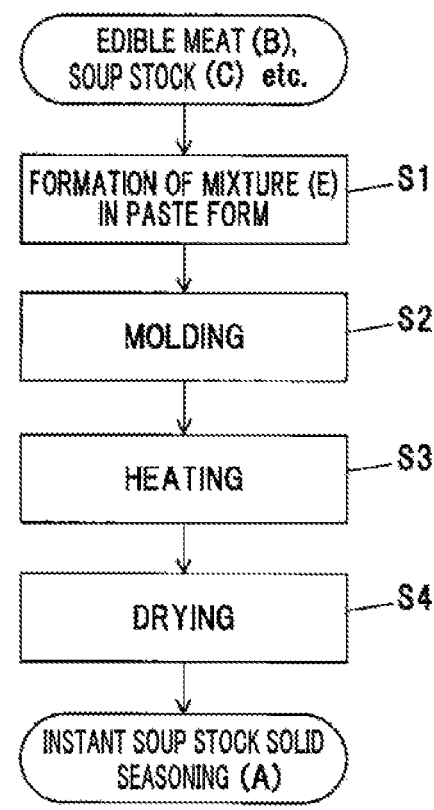

INSTANT SOUP STOCK SOLID SEASONING AND METHOD FOR MANUFACTURING SAME

TECHNICAL FIELD

The present invention relates to an instant soup stock solid seasoning and a method for manufacturing the same.

BACKGROUND ART

Bouillon seasonings, which are obtained by processing raw meat as a main ingredient, together with meat extract and vegetables, into paste and drying the paste, are known (see, e.g., Patent Literature 1). Patent Literature 1 discloses bouillon seasoning which is manufactured using only natural ingredients and from which bouillon (consommé, soup, stock) with the same quality as chefs homemade bouillon can be obtained through extraction for a short time.

CITATION LIST

Patent Literature

Patent Literature 1: JP 2007/43952 A

SUMMARY OF INVENTION

Technical Problem

However, inosinic acid contained in edible meat (chicken, beef, mutton legs, pork legs, etc.) as a main ingredient of the bouillon seasoning of Patent Literature 1 is not more than ⅓ of inosinic acid contained in dried bonito fillet (true dried fillet) which is also used as a source of soup stock in the same manner as the bouillon seasoning of Patent Literature 1. The inosinic acid is one of representative umami components contained in foods and the inosinic acid content greatly affects umami intensity of extracted stock.

On the other hand, the dried bonito fillet containing a high proportion of inosinic acid generally requires a manufacturing process which takes a very long time. For example, a drying process involving firing; smoking and water absorption by mold requires about four months.

It is an object of the invention to provide an instant soup stock solid seasoning which is made using edible meat as a main ingredient, is rich in inosinic acid and can be manufactured in a relatively short time, and a manufacturing method thereof.

Solution to Problem

To achieve the above-mentioned object, an aspect of the invention provides a method for manufacturing an instant soup stock solid seasoning defined below, and an instant soup stock solid seasoning defined below.

A method for manufacturing an instant soup stock solid seasoning, comprising: a step of forming a mixture that comprises raw edible meat and soup stock having a higher mass percent concentration of inosinic acid than the edible meat; and a step of drying the mixture by a microwave reduced-pressure drying method.

The method for manufacturing an instant soup stock solid seasoning, wherein the step of drying a mixture comprises a first drying step using the microwave reduced-pressure drying method and a second drying step performed using hot-air drying after the first drying step.

The method for manufacturing an instant soup stock solid seasoning, wherein the step of drying the mixture is performed in such a manner that the process is switched to the second drying step when the evaporated amount of water contained in the mixture reaches a range of not less than 15% and not more than 25% of the total mass of the undried mixture in the first drying step.

The method for manufacturing an instant soup stock solid seasoning, wherein the step of forming a mixture comprises a step of molding the mixture in paste form into such a shape that a distance from the surface to an inner portion located farthest from the surface is not less than 5 cm.

The method for manufacturing an instant soup stock solid seasoning, wherein the soup stock used in the step of forming a mixture comprises soup stock comprising not less than 360 mg of inosinic acid per 100 g portion.

The method for manufacturing an instant soup stock solid seasoning, wherein the edible meat used in the step of forming a mixture comprises chicken breast.

An instant soup stock solid seasoning that is obtained by drying a mixture in paste form comprising edible meat and soup stock having a higher mass percent concentration of inosinic acid than the edible meat, wherein a distance from the surface to an inner portion located farthest from the surface is not less than 5 cm.

The instant soup stock solid seasoning, wherein the soup stock comprises not less than 360 mg of inosinic acid per 100 g portion.

The instant soup stock solid seasoning, wherein the edible meat comprises chicken breast.

Advantageous Effects of Invention

According to the invention, it is possible to provide an instant soup stock solid seasoning which is made using edible meat as a main ingredient, is rich in inosinic acid and can be manufactured in a relatively short time, and a manufacturing method thereof.

BRIEF DESCRIPTION OF DRAWING

FIG. 1 is a flowchart showing a process of manufacturing an instant soup stock solid seasoning (A) in the present embodiment.

DESCRIPTION OF EMBODIMENTS (Ingredients of Instant Soup Stock Solid Seasoning (A))

The instant soup stock solid seasoning (A) in the present embodiment contains edible meat (B) as a main ingredient and soup stock (C) having a higher mass percent concentration of inosinic acid (5'-inosinic acid) than the edible meat (B). The instant soup stock solid seasoning (A) may also contain a vegetable(s) (D). Furthermore, other additives such as salt, dietary fibers, spices, or spice extracts may be also contained.

The edible meat (B) is meat for human consumption, such as chicken, beef, mouton or pork. The part of the edible meat (B) is not specifically limited. In case of, e.g., chicken, it is possible to use meat, tender and thigh, etc.

In this regard, however, chicken thigh generally contains a high proportion of fat, and the fat may be oxidized when dried. Since taste is likely to deteriorate due to oxidation of fat, it is preferable to use defatted meat in case of using chicken thigh. For example, it is possible to reduce the amount of fat located inside by boiling thigh once, followed by squeezing the juice out or centrifugation.

The type of the edible meat (B) can be selected according to the intended use of the instant soup stock solid seasoning (A). For example, beef is used as the edible meat (B) when manufacturing the solid seasoning (A) as a base of beef consommé, and chicken is used as the edible meat (B) when manufacturing the solid seasoning (A) as a base of chicken consommé. Of those, chicken is preferable as the edible meat (B), and chicken breast with little fat is particularly preferable since its soup stock is suitable as the base of relatively any dishes.

The soup stock (C) is soup stock extracted from edible meat, bones of the edible meat, or both and is preferably soup stock extracted from the edible meat (B) as a main ingredient of the instant soup stock solid seasoning (A), bones of the edible meat (B), or both.

It is possible to extract the soup stock (C) with boiling water, stock, or tang (soup in Chinese cuisine). In addition, the soup stock (C) may be liquid soup stock as-extracted, or may be powder soup stock obtained through concentration and drying.

The soup stock (C), which is added to the edible meat (B) to increase the inosinic acid concentration in the instant soup stock solid seasoning (A), has a higher mass percent concentration of the inosinic acid than the edible meat (B).

The inosinic acid content in, e.g., 100 g of chicken, beef and pork, which can be used as the edible meat (B), is respectively about 76 mg, 107 mg and 122 mg. On the other hand, the inosinic acid content in 100 g of dried bonito fillet, as a representative source of soup stock from which soup stock with intense umami can be extracted, is not less than 400 mg.

That is, the mass percent concentration of the inosinic acid in edible meat is not more than ⅓ of the mass percent concentration of the inosinic acid in dried bonito fillet, and only drying edible meat cannot provide the source of soup stock from which soup stock with intense umami comparative to dried bonito fillet can be extracted.

For this reason, the soup stock (C) is added to the edible meat (B) to increase the inosinic acid concentration in the instant soup stock solid seasoning (A). Preferably, the soup stock (C) contains the inosinic acid at a concentration equivalent to or greater than (not less than 90°/o of) that in dried bonito fillet, e.g., not less than 360 mg of the inosinic acid per 100 g portion, so that the instant soup stock solid seasoning (A) can have an intensity of umami close to that of dried bonito fillet.

The vegetables (D) are, e.g., celery, onion and carrot, etc., and are not specifically limited. In addition, the form of the vegetables (D) is also not specifically limited and is, e.g., raw vegetable, vegetable paste, vegetable juice or vegetable extract extracted from vegetable.

The mass of water contained in the instant soup stock solid seasoning (A) is not more than 15% of the total mass of the instant soup stock solid seasoning (A). The form of the instant soup stock solid seasoning (A) is not specifically limited and may be a molded body or powder. In addition, the molded body may be cut into a predetermined shape (e.g., a cube shape), or the molded body may be shaved into the form of flakes. In case of, e.g., the molded body, it is possible to select the size and shape according to the intended use. Meanwhile, in case of the small and fine form such as powder or flakes, it may be contained in filter bags formed of a filter sheet.

By using the microwave reduced-pressure drying method in a process of manufacturing the instant soup stock solid seasoning (A) as described later, it is possible to significantly reduce time required for the drying process. In general, drying efficiency by hot-air drying decreases with an increase in thickness of an object. Therefore, the effect of the microwave reduced-pressure drying method is more remarkable when the instant soup stock solid seasoning (A) is a molded body having a certain size, e.g., when a distance from the surface to an inner portion located farthest from the surface is not less than 5 cm.

The instant soup stock solid seasoning (A) is rich in inosinic acid. Therefore, when molded into a shape which resembles dried bonito fillet containing a large amount of inosinic acid, it is possible to obtain a feeling similar to when using the dried bonito fillet. In case that the instant soup stock solid seasoning (A) is molded into a shape resembling the dried bonito fillet, for example, a distance from the surface to an inner portion located farthest from the surface is not less than 5 cm.

According to the instant soup stock solid seasoning (A), anyone can obtain high-quality soup stock (bouillon) only by several ten seconds to several minutes of extraction in boiling water. In other words, quality substantially equal to that made by a professional cook based on the technique from his/her long experience in cooking and spending several hours to ten and several hours of extraction time can be obtained easily at home.

In addition, the instant soup stock solid seasoning (A) is manufactured using only natural ingredients, smells natural, has umami and allows clear soup stock to be obtained.

(Method for Manufacturing the Instant Soup Stock Solid Seasoning)

A specific example of a method for manufacturing the instant soup stock solid seasoning (A) in the present embodiment will be described below.

FIG. 1 is a flowchart showing a process of manufacturing the instant soup stock solid seasoning (A) in the present embodiment.

Firstly, the raw edible meat (B) is shredded and is mixed and stirred with the soup stock (C) added thereto, thereby forming a mixture (E) in paste form (Step St). The amount of the soup stock (C) added at this stage is set according to the intensity of umami required for the instant soup stock solid seasoning (A), and is set in the range of, e.g., not less than 20 mass % and not more than 40 mass % of the edible meat (B).

Optionally, the vegetables (D) may be added to the edible meat (B) and the soup stock (C) in Step S1. The amount of the vegetables (D) added is set in the range of, e.g., not less than 5 mass % and not more than 10 mass % of the edible meat (B). Other additives such as salt, dietary fibers, spices, or spice extracts may be further added.

Next, the mixture (E) is molded into a predetermined shape (Step S2). The mixture (E) is molded by, e.g., a method such as filling a container (mold), filling a casing using a stuffer machine, or simply spreading with a uniform thickness. When manufacturing the instant soup stock solid seasoning (A) having, e.g., a dried bonito fillet shape, a dried bonito fillet-shaped container is used. When the mixture (E) is not molded, Step S2 is omitted.

Next, the mixture (E) is heated (Step S3). It is possible to sterilize and solidify the mixture (E) by applying heat. However, when there is no concern of contamination with germs and its multiplication, it is not necessary to perform the heating step. In this case, Step S3 is omitted. In addition, when there is no concern of contamination with germs and its multiplication, an aging step may be employed in placed of the heating step.

Next, the mixture (E) is dried and the instant soup stock solid seasoning (A) is thereby obtained (Step S4). This drying is performed until the mass of water contained in the instant soup stock solid seasoning (A) becomes not more than 15% of the total mass of the instant soup stock solid seasoning (A).

The mixture (E) is dried by, e.g., a through-circulation drying method, a freeze-drying method, or a vacuum drying method. When using, e.g., the through-circulation drying method, the mixture (E) can be efficiently dried by, after hot-air drying, repeatedly cooling or standing at room temperature and further drying with hot air. If dried at high temperature without stopping, the surface of the mixture (E) may become solid and this may result in that water inside is less likely to evaporate.

Furthermore, it is preferable to use the microwave reduced-pressure drying method in the drying step to reduce time required for drying. By combining, e.g., the microwave reduced-pressure drying method with the hot-air drying, it is possible to significantly reduce time required for drying the mixture (E).

In detail, after performing a first drying step using the microwave reduced-pressure drying method, a second drying step using the hot-air drying can be performed. After the hot-air drying, it is generally cooled down, or stood at room temperature. It is also possible to repeat hot-air drying and cooling or standing at room temperature.

It is preferable that the process be switched from the first drying step using the microwave reduced-pressure drying method to the second drying step using the hot-air drying when the evaporated amount of water contained in the mixture (E) (the mass of the evaporated water) reaches a range of not less than 15% and not more than 25% of the total mass of the undried mixture (E) in the first drying step. When the evaporated amount of water contained in the mixture (E) is more than 25% of the total mass of the mixture (E), significant deformation and burst occur due to excessive drying, causing a decrease in commercial value. On the other hand, when the evaporated amount of water contained in the mixture (E) is less than 15% of the total mass of the mixture (E), the microwave reduced-pressure drying method is less efficient at drying and this may increase time required for the entire drying step.

As an example, when the mixture (E) molded into a dried bonito fillet shape and steam-heated is dried by the microwave reduced-pressure drying method, the evaporated amount of water contained in the mixture (E) can reach about 20% of the total mass of the mixture (E) in about 2 hours. In case of using the hot-air drying method in place of the microwave reduced-pressure drying method, about 4 hours are required until the evaporated amount of water contained in the mixture (E) becomes about 20% of the total mass of the mixture (E).

After that, the instant soup stock solid seasoning (A) obtained through the process involving the above-described Steps S1 to S4 may be pulverized into powder, cut or shaved, if required.

In order to obtain the instant soup stock solid seasoning (A) processed into powder, etc., the mixture (E) may be pulverized, cut or shaved before drying or during drying in the drying step (Step S4). In addition, spices or spice extracts may be added, if required, to the instant soup stock solid seasoning (A) in the form of powder.

(Method for Manufacturing the Soup Stock)

Next, a manufacturing method will be described as an example in which a nucleic-acid rich chicken extract with a high inosinic acid content is manufactured as an example of the soup stock (C) in the present embodiment.

Firstly, 20 kg of water is added to 10 kg of a whole chicken and soup stock is extracted in boiled water of about 95° C. for 2 hours. Then, the removal of misto (mixture) and the oil/liquid separation in the soup stock are conducted, and the liquid separated from the oil is concentrated to Brix of 32%, thereby obtaining chicken extract. Brix of 32% here means that the Brix value expressing the level of soluble solids content in a solution is 32%.

When the obtained chicken extract is processed into powder, for example, heat sterilization is performed at 95° C. for 30 minutes and spray drying is then performed at an ambient temperature of 180° C. and an exhaust air temperature of 80° C., thereby obtaining powder chicken extract.

Effects of the Embodiment

According to the embodiment, by adding soup stock which is rich in inosinic acid, it is possible to provide an instant soup stock solid seasoning from which a soup stock with intense umami can be extracted even though edible meat is used as a main ingredient. In addition, time required for manufacturing the instant soup stock solid seasoning in the embodiment is very short as compared to dried bonito fillet for which firing, smoking and water absorption by mold are performed in the drying step.

In addition, by using the microwave reduced-pressure drying method in the drying step, it is possible to further reduce the time required for the manufacturing process. For example, the instant soup stock solid seasoning, which has intense umami substantially equal to that of dried bonito fillet requiring about four months to manufacture, can be manufactured in about 10 days.

Example 1

Amino acid components and nucleic acid components of a nucleic-acid rich chicken extract manufactured as the soup stock (C) by the above method in the embodiment were analyzed.

Table 1 below is a table showing the amino acid components and nucleic acid components of the nucleic-acid rich chicken extract as the soup stock (C) in the embodiment and of a known chicken extract. The numerical values for the amino acid components and nucleic acid components are mass (mg) contained per 100 g of each extract having Brix of 32%

TABLE 1

| | | Nucleic-acid rich chicken extract | Known chicken extract |
|---|---|---|---|
| Amino acid | Aspartic acid | 51.73 | 42.17 |
| | Threonine | 51.03 | 31.70 |
| | Serine | 81.55 | 15.54 |
| | Glutamic acid | 200.24 | 133.56 |
| | Proline | 36.13 | 26.23 |
| | Glycine | 96.50 | 54.23 |
| | Alanine | 121.99 | 59.16 |
| | Cysteine | 0.00 | 0.00 |
| | Valine | 42.87 | 24.84 |
| | Methionine | 56.36 | 15.78 |
| | Isoleucine | 18.23 | 13.23 |
| | Leucine | 48.46 | 26.34 |
| | Tyrosine | 31.55 | 17.87 |
| | Phenylalanine | 35.57 | 13.79 |
| | Lysine | 80.87 | 49.76 |
| | Histidine | 28.68 | 21.11 |
| | Arginine | 48.54 | 27.96 |

TABLE 1-continued

|   |   | Nucleic-acid rich chicken extract | Known chicken extract |
|---|---|---|---|
|   | Total | 1030.29 | 573.27 |
| Nucleic acid | Adenosine monophosphate | 85.54 | 6.28 |
|   | 5'-inosinic acid | 396.58 | 10.84 |
|   | 5'-guanylic acid | 8.75 | 5.33 |
|   | Adenosine 5'-diphosphate | 2.92 | 2.25 |
|   | Adenosine 5'-triphosphate | 0.00 | 0.00 |
|   | Total | 493.79 | 24.7 |

Table 1 shows that the nucleic-acid rich chicken extract as the soup stock (C) contains the same level of inosinic acid as that of dried bonito fillet (true dried fillet).

Example 2

A specific example of the process of manufacturing the instant soup stock solid seasoning (A) in the embodiment will be described.

Firstly, about 1000 g of chicken breast as the edible meat (B), together with about 240 g of nucleic-acid rich chicken extract as the soup stock (C), about 8 g of salt and about 40 g of dietary fibers added thereto, were sufficiently mixed by a food mixer, and the mixture (E) in paste form was thereby formed (Step S1).

Next, about 600 g of the mixture (E) was placed to fill a dried bonito fillet-shaped container and was molded into a dried bonito fillet shape (Step S2).

Next, the mixture (E) molded into a dried bonito fillet shape was steam-heated under the conditions of 90° C. for 20 minutes (Step S3).

Next, the mixture (E) was taken out of the container and was then dried (Step S4). The first drying step was performed by the microwave reduced-pressure drying method and the mixture (E) was then left overnight under the temperature condition of 5° C. Following this, the second drying step was performed by the hot-air drying using a hot-air dryer under the conditions of 80° C. for 8 hours and the mixture (E) was then left overnight at room temperature. The second drying step and the leaving overnight at room temperature were repeated nine times.

The microwave reduced-pressure drying in the first drying step was performed using a microwave and reduced-pressure dryer (model: FDU-202VD-02) from Fuji Electronic Industrial Co., Ltd. The process conditions were a setting temperature of 33 (a product temperature of about 35° C.), a vacuum level of 40 mmHg, a microwave output of 400 W and drying time of 2 hours.

Although drying is performed under reduced pressure, deformation of the mixture (E) due to expansion is prevented as long as the process conditions are as described above. When the setting temperature, the vacuum level and the microwave output are out of the range defined between plus and minus 10% of the above-mentioned values of the process conditions, drying is accelerated rapidly and this may cause significant deformation and burst and a resulting decrease in commercial value, or in an opposite manner, drying does not proceed efficiently and the time required for the drying step may be increased.

The process was switched from the first drying step to the second drying step at the stage where the mass of the mixture (E) was reduced from about 600 g to about 480 g in the first drying step, i.e., when the evaporated amount of water contained in the mixture (E) (the mass of the evaporated water) reached about 20% of the total mass of the undried mixture (E).

400 g of water was evaporated from 600 g of the mixture (E) by the above drying step, and 200 g of the dried bonito fillet-shaped instant soup stock solid seasoning (A) with a water content of not more than 15 mass % was obtained.

Example 3

The amino acid components and nucleic acid components of the soup stock extracted from the instant soup stock solid seasoning (A) obtained in Example 2 were analyzed.

Table 2 below is a table showing the amino acid components and nucleic acid components of soup stocks respectively extracted from the instant soup stock solid seasoning (A) obtained in Example 2, dried chicken breast and dried bonito fillet (true dried fillet). The numerical values for the amino acid components and nucleic acid components are mass (mg) contained per 100 g of soup stock extracted from each source of soup stock. The soup stock was extracted by adding 200 ml of boiled water to 10 g of flakes of each source of soup stock and leaving to stand for 1 minute.

TABLE 2

|   |   | Instant soup stock solid seasoning (A) | Dried chicken breast | Dried bonito fillet |
|---|---|---|---|---|
| Amino acid | Aspartic acid | 4.70 | 0.38 | 0.13 |
|   | Threonine | 3.63 | 0.42 | 0.19 |
|   | Serine | 5.27 | 0.61 | 0.31 |
|   | Glutamic acid | 9.25 | 1.06 | 0.68 |
|   | Proline | 1.83 | 0.24 | 1.10 |
|   | Glycine | 6.24 | 0.59 | 0.54 |
|   | Alanine | 9.11 | 0.94 | 1.51 |
|   | Cysteine | 0.00 | 0.00 | 0.00 |
|   | Valine | 2.72 | 0.26 | 0.69 |
|   | Methionine | 1.32 | 0.18 | 0.12 |
|   | Isoleucine | 2.11 | 0.22 | 0.46 |
|   | Leucine | 3.57 | 0.45 | 0.90 |
|   | Tyrosine | 2.01 | 0.34 | 0.19 |
|   | Phenylalanine | 1.67 | 0.24 | 0.27 |
|   | Lysine | 4.17 | 0.36 | 1.93 |
|   | Histidine | 1.34 | 0.14 | 34.68 |
|   | Arginine | 3.42 | 0.44 | 0.19 |
|   | Total | 62.36 | 6.87 | 43.88 |
| Nucleic acid | Adenosine monophosphate | 1.64 | 0.77 | 1.29 |
|   | 5'-inosinic acid | 24.35 | 6.81 | 23.57 |
|   | 5'-guanylic acid | 0.54 | 0.15 | 0.09 |
|   | Adenosine 5'-diphosphate | 0.00 | 0.22 | 0.24 |
|   | Adenosine 5'-triphosphate | 0.00 | 0.00 | 0.00 |
|   | Total | 26.53 | 7.95 | 25.19 |

Table 2 shows that the inosinic acid content in the soup stock extracted from the instant soup stock solid seasoning (A) is equivalent to that in soup stock extracted from dried bonito fillet, and the glutamic acid content is not less than 10 times the soup stock extracted from dried bonito fillet. That is, it is shown that the soup stock extracted from the instant soup stock solid seasoning (A) has intense umami.

Although the embodiment and Examples of the invention have been described, the invention is not intended to be limited to the embodiment and Examples, and the various kinds of modifications can be implemented without departing from the gist of the invention.

In addition, the invention according to claims is not to be limited to the embodiment and Examples described above. Further, it should be noted that all combinations of the features described in the embodiment and Examples are not necessary to solve the problem of the invention.

INDUSTRIAL APPLICABILITY

Provided are an instant soup stock solid seasoning which is made using edible meat as a main ingredient, is rich in inosinic acid and can be manufactured in a relatively short time, and a manufacturing method thereof.

The invention claimed is:

1. A method for manufacturing an instant soup stock solid seasoning, comprising:
    a step of forming a mixture that comprises raw edible meat and soup stock, the soup stock having a higher mass percent concentration of inosinic acid than the edible meat; and
    a step of drying the mixture by a microwave reduced-pressure drying method thereby obtaining the instant soup stock solid seasoning after the step of forming the mixture,
    wherein the step of forming the mixture comprises a step of molding the mixture in paste form into such a shape that a distance from the surface to an inner portion located farthest from the surface is not less than 5 cm.

2. The method for manufacturing an instant soup stock solid seasoning according to claim 1, wherein the step of drying a mixture comprises a first drying step using the microwave reduced-pressure drying method and a second drying step performed using heated air drying after the first drying step.

3. The method for manufacturing an instant soup stock solid seasoning according to claim 2, wherein the step of drying the mixture is performed in such a manner that the process is switched to the second drying step when the mass of the water evaporated from the mixture by the first drying step reaches a range of not less than 15% and not more than 25% of the total mass of the undried mixture before the first drying step.

4. The method for manufacturing an instant soup stock solid seasoning according to claim 2, wherein the first drying step is carried out under the process conditions of a setting temperature, a vacuum level, and a microwave output of a microwave dryer are 33° C.±10%, 40 mmHg±10%, 400 W±10%, respectively.

5. The method for manufacturing an instant soup stock solid seasoning according to claim 1, wherein the soup stock used in the step of forming a mixture comprises soup stock comprising not less than 360 mg of inosinic acid per 100 g portion.

6. The method for manufacturing an instant soup stock solid seasoning according to claim 1, wherein the edible meat used in the step of forming a mixture comprises chicken breast.

* * * * *